United States Patent [19]

Henkler et al.

[11] 4,225,098
[45] Sep. 30, 1980

[54] TAPE TRANSPORT APPARATUS

[75] Inventors: Herbert Henkler, Battenberg; Manfred Gehrung, Ludwigshafen; Eduard Rasek, Wiesloch, all of Fed. Rep. of Germany

[73] Assignee: BASF Aktiengesellschaft, Ludwigshafen, Fed. Rep. of Germany

[21] Appl. No.: 937,721

[22] Filed: Aug. 29, 1978

[30] Foreign Application Priority Data

Aug. 29, 1977 [DE] Fed. Rep. of Germany ....... 2738898
Jan. 18, 1978 [DE] Fed. Rep. of Germany ....... 2801936

[51] Int. Cl.³ ............................................. G11B 15/32
[52] U.S. Cl. .................................... 242/192; 242/204
[58] Field of Search ............... 242/192, 204, 203, 202, 242/201, 207, 208, 209, 75.51, 75.47, 206, 210

[56] References Cited

U.S. PATENT DOCUMENTS

| 3,370,804 | 2/1968 | Peyton | 242/192 |
|---|---|---|---|
| 3,408,016 | 10/1968 | Ganske et al. | 242/203 |
| 3,417,937 | 12/1968 | Van Slageren | 242/202 |
| 3,482,800 | 12/1969 | Barnett et al. | 242/192 |
| 3,638,880 | 2/1972 | Hollingsworth | 242/192 |
| 3,921,933 | 11/1975 | Rotter et al. | 242/192 |

*Primary Examiner*—George F. Mautz
*Attorney, Agent, or Firm*—Keil & Witherspoon

[57] ABSTRACT

This invention concerns a tape transport apparatus based on the contact-winding principle and, in particular, an apparatus for generating/keeping constant the tape tension during all operational phases of the tape transport, and for the quick, trouble-free braking of each tape pack, independently of the amount of tape wound thereon. By means of magnetic braking devices allocated to each tape pack and to the capstan whose braking action depends upon the momentary diameter of the tape packs, the object of the invention is achieved technically and economically with the greatest possible success. The apparatus is applicable in all cases where tape-like material is to be uniformly wound and transported without undue stress, and in particular for magnetic tape transport systems.

25 Claims, 15 Drawing Figures

TAPE TRANSPORT APPARATUS

This invention relates to a tape transport apparatus of the type having a take-up pack and a supply pack each rotatable on a respective shaft biased toward a tape drive roll rotatable on a fixed shaft and having a resiliently deformable peripheral portion so that the outermost tape turn of each tape pack is driving engaged with the drive roll, the bias of said packs toward the drive roll being variable in accordance with the acceleration and deceleration required of the tape packs and being generated by pressure-generating means comprising braking means which may also be used to brake the shafts carrying said tape packs. The invention also relates to a method for generating a constant tape tension in such a tape transport apparatus.

In known tape transport apparatus the tape packs are arranged on rotatable shafts mounted on movable arms or carriages biased, by spring force or by means of electrically generated forces, toward the capstan such that the take-up and supply packs (or hubs when no magnetic tape is present on the hubs) always remain in contact with the drive roll or capstan. It is a common feature of these known apparatus that they comprise devices in the form of rope friction brakes for generating and controlling the bearing pressure effect and the tape tension.

Tape transport apparatus of this type may be used, generally, for signal storage and, especially, for storing data in electronic data processing. They offer the advantage, in comparison with other tape transport systems of realizing very high tape speeds with relatively low mechanical and electrical requirements while avoiding inadmissible tensile stress of the tape during acceleration, e.g. during start or stop operations.

In the known embodiments of such contact winding transport systems, the capstan of the tape transport apparatus, which is coupled to the drive motor, also acts as tape transport brake when the drive motor is disconnected, short-circuited or possibly supplied with a countervoltage until the capstan has stopped.

Contact winding tape transport systems of this known type have been disclosed, for example, in German Gebrauchsmuster Nos. 7 425 512 and 7 613 079. In German Gebrauchsmuster No. 7 425 512 a friction brake is used as a braking device which always acts upon the shaft of the tape supply pack, and which tends to reduce the braking force as the pack diameter decreases. In order to generate a constant tape tension, the bearing forces at the points of contact in this transport mechanism are substantially equal.

In the transport arrangement of German Gebrauchsmuster 7 613 079 an extremely constant tape tension is achieved during the entire tape transport operation by the additional application of a thin belt around the resilient peripheral portion of the capstan. In both these transport systems, additional steps are required, in order to achieve the desired constant tape tension. In a known magnetic tape transport mechanism according to U.S. Pat. No. 3,370,803, the said bearing forces at the two points of contact of the two tape packs with the capstan differ from one another, in order to generate tape tension. To this end, a rope tension device which co-operates with the shafts carrying the tape packs and with the capstan is required. Friction brake devices of the type referred to are not used in the transport apparatus according to most embodiments shown herein of the present invention.

Mechanical brakes in tape transport apparatus suffer from the main disadvantage of a lack of constant tape tension (particularly disadvantageous when recording data on the tape) and a restricted life. The friction effect on which these brakes rely depends, among other things, on temperature, speed and surface properties (oil, dust, wear). The exact control of tape tension and the bearing pressure effect is only feasible at great expense, if at all. Moreover, known embodiments require a comparatively large pivoting angle and/or a comparatively high speed before the braking action becomes operative—a disadvantage noticeable as such in start and stop operations. These effects, as well as large adhesive friction will cause large fluctuations of tape tension. The present invention is based on the consideration of replacing frictional brakes by magnetically operated brakes which have more easily influenced and reproducible properties.

Braking devices based on the magnetic principle are basically known as synchronous, hysteresis and eddy current brakes.

Eddy current brake systems for magnetic tape recorders are disclosed in German Gebrauchsmuster Nos. 7 100 447 and 7 100 449. In these arrangements, an eddy current brake consists of at least one fixed magnetic system having an air gap and of an eddy current disc consisting in each case of a non-magnetizable, high-conductivity material which projects into the air gap. A feeler arm for scanning tape tension is provided which varies the torque of the eddy current disc and, thus, of the shafts with the tape reels connected thereto, in order to achieve a constant or nearly constant tape tension. This brake does not serve for braking to a stop, however. To this end additional brakes are used. Nor do such known magnetic tape recorders operate according to the contact-winding principle like the tape transport apparatus of the present invention.

The present invention has for its primary object to provide a tape transport apparatus based on the contact-winding principle having a simple effective braking device which, on the one hand, provides in every operating condition a near-constant tape tension and, on the other hand, permits the tape to be stopped or started at any desired instant, without regard to the amount of tape present on the take-up and supply packs.

According to one aspect of the present invention a tape transport apparatus of the type referred to is characterized in that the braking means comprise brake elements arranged on the shafts carrying said tape packs which brake elements penetrate into the magnetic field or fields of at least one fixed magnetic system to produce a braking effect through the interaction of the braking elements in the magnetic field(s).

Magnetic brakes do not exhibit the previously mentioned disadvantages of mechanical brakes, and they may be made up of standard components. The employment of magnetic brakes has the advantage that friction may occur only as a secondary braking component, making them virtually non-wearing. The dissipation of the heat generated by the magnetic brakes can be easily controlled.

In general, the problem encountered in the case of tape transport apparatus of the type referred to, which stem from the different torques applied to the shafts carrying the tape packs according to the amount of tape wound on a particular pack at a given moment are capable of solution. Such problems arise, for example, during braking from the desired speed in cases where the supply pack still carries a large amount of tape, i.e. has a diameter larger than the take-up pack. As the braking operation of the capstan sets in, at the beginning both packs will tend to continue rotating due to their moment of inertia. However, since in the above-cited case the supply pack has a larger moment of inertia than the take-up pack there is a risk that the feed pack, owing to slip, cannot be decelerated as effectively as the take-up pack and that, as a result, the tape tension is reduced and even tape loops may occur. This effect can be avoided by using apparatus according to the invention. Also, when the tape is accelerating from zero to nominal speed, the tape tension may exceed the maximum and minimum permissible tolerance limits if the tape packs have different amounts of tape wound thereon. This will occur, for example, when the take-up pack has a greater diameter than the supply pack. Due to the dissimilar moments of inertia and due to tape slip, the supply pack may be accelerated more rapidly, and this may lead to inadmissibly low tape tension or to the formation of tape loops. If the take-up pack has a smaller amount of tape than the supply pack, acceleration of the tape may cause increased tape tension and, possibly, breakage of the tape.

Apart from the above-considered pure start-stop situations, it is important, when recording and reproducing signals irrespective of their type that a constant tape tension should be generated and maintained, in order to avoid recording and reading errors.

The apparatus of the invention allows the simple automatic setting of the torque characteristic in dependence on the winding diameter of the tape packs, the said adjustment being achieved by the varying degree to which the brake element enters the magnetic field(s). Besides, this arrangement enables the start-stop operations to be shortened by mechanical or electrical switching of the magnets.

An apparatus according to the present invention results in a simple construction, predominantly consisting of inexpensive, commercially available components. The basic principle of this transport arrangement will now be considered, by way of example, in the case of two tape packs which are each urged against a drive rollor capstan having a resilient, e.g. rubber, peripheral portion with, for example, a spring force P. This spring force is dimensioned in such a way that, during the start-stop operation, no undesirable slip occurs between the tape packs and the capstan. The take-up pack runs without braking and the supply pack is decelerated by means of a magnetic brake in such a way that a braking moment M applied to the supply pack counteracts the torque of the capstan and a component dP is produced which counteracts said spring force P. The condition $dP < P$ is always fulfilled. By way of approximation, $M = dP \times l$, l being the distance between the lines of action (of brake disc and magnet) and the axis of the satellite and being approximately equal to the radius of the overlapping surface of said brake disc and said magnet (schematically shown in FIG. 13). M and dP can be generated by suitable choice and arrangement of standard magnetic systems. With these two quantities, tape tension and bearing pressure effects can be adjusted.

The brake system may be dimensioned for tape transport operation in such a way that a low braking torque is applied to the supply pack if its diameter is large, and a larger braking torque is applied to the supply pack if its diameter is small. This braking action can be realized if dP is chosen by suitable dimensioning, because the forces M and dP are effective in the same direction (M and dP both increase tape tension and reduce the progression of the take-up pack). Dimensioning simply consists in the once-and-for-all positioning of a system. The brake element or disc is coupled to the shaft carrying the supply pack and a magnet is connected to the chassis and arranged eccentrically of the brake disc. The above-described effect occurs at the smallest rotary movement. Suitably, in an apparatus according to the invention, the braking means comprises a hysteresis brake. This type of brake operates with a high degree of coupling and constitutes a favourable solution in practice. Since a hysteresis brake consists of hysteresis material and a magnet, eddy currents are suppressed and speed-independent setting of the braking torque, merely on the basis of the geometrical layout, becomes possible.

According to another advantageous embodiment of the apparatus, the braking means comprises an eddy current brake. This type of brake has a lower yet sufficient coupling factor and a comparatively large control energy requirement which depends upon rotational speed.

In both types of brake, magnetic field strength may be generated by stationary or moving, non-adjustable or adjustable permanent magnets or by means of electromagnets which are arranged laterally of, or above, a brake element, e.g. disc or drum, connected to the shafts carrying the tape packs or which envelop these components. For reasons of expense for the control, and in view of the efficiency, electric energization makes technical sense only in the case of hysteresis brakes. In the case of eddy current brakes, the energy to be switched is especially high, and the electromagnetic stray fields and inductive peaks may make the employment of such eddy current brakes in a magnetic tape system more difficult.

The results and the constant tape tension which can be achieved by magnetic brakes in apparatus according to the invention are much better than the values obtained by means of hitherto employed brakes used in known tape transporting apparatus. Particular advantages, however, must be seen in the saving of energizing power, in the problem-free heat dissipation and in the reproducible adjustability of desired tape tension characteristics of the tape pack driving pressure effect. This adjustment, for example, may be achieved by varying the eccentricity of the air gap, the inclination or design of the magnet.

In the apparatus of the invention, the brake elements, e.g. discs, allocated to the tape packs project into the air gap(s) of the magnetic system(s) to a varying degree, depending on the momentary tape pack diameter. With smaller or larger momentary tape pack diameter, the brake elements enter the air gap(s) to a higher or lesser degree. Since the track velocity on each brake element decreases in the direction toward its rotational axis, the flow of the eddy currents induced in the brake element is reduced in the case of the eddy current brake. During start-stop operations and with decreasing pack diameter the braking force is therefore reduced, whereas with increasing pack diameter the braking force is increased. With large effective sizes (diameters) of the braking element (disc), the braking moment is likewise high, so that, owing to the two effects operating in the same sense the braking effect increases with the diameter for start-stop operations. A similar relation between braking force and tape pack diameter can also be achieved by suitable design and arrangement of the hysteresis brake.

Of particular importance in this context are energy-saving variants of the device of the invention, characterized in that the brake arrangements employ braking energy for driving the capstan in that a brake disc mounted on the capstan shaft is devised in the shape of a magnetic disc and is driven with slip by means of magnetic brake discs mounted on the shafts carrying the tape packs, the brake discs preferably having an effective diameter larger than the momentary tape pack and the magnetic disc having a diameter smaller than that of the capstan. In this particular embodiment of the brake arrangement the brake discs can be friction discs which are also energy-saving.

According to another aspect of the present invention, a method for generating a constant tape tension in a tape transport apparatus of the type referred to is characterized in that braking is effected by means of a magnetic braking system for applying a braking torque on brake elements arranged on the shafts carrying the tape packs in dependence on the momentary diameters of the associated tape packs.

Suitably it is advantageous, during acceleration of the tape packs from rest to a desired speed, to apply to the brake element associated with the tape pack having the smaller diameter a larger braking torque than upon the brake element associated with the tape pack having the larger diameter. Furthermore it is advantageous during deceleration of the tape packs from a desired speed to apply a larger braking torque to the braking element whose associated tape pack has the larger diameter. In this way it is possible to equalize different moments of inertia of the tape packs.

Suitably, during tape transport at a desired speed a larger braking torque is applied to the braking element associated with the tape pack which acts as the supply pack to ensure a highly constant tape tension.

Finally, the invention further provides for the combination of the above-described steps, to be comprised as follows:

During acceleration from zero, application of a larger braking torque to the brake disc of the pack having the smaller diameter until the desired speed has been reached, during tape transport, application of a larger braking torque to the brake disc of the pack which acts as supply pack, and during braking from the desired speed down to zero, application of a larger braking torque to the brake disc of that tape pack which has the larger diameter.

The invention will now be described by way of example, with reference to the accompanying drawings, in which.

Figure 11:
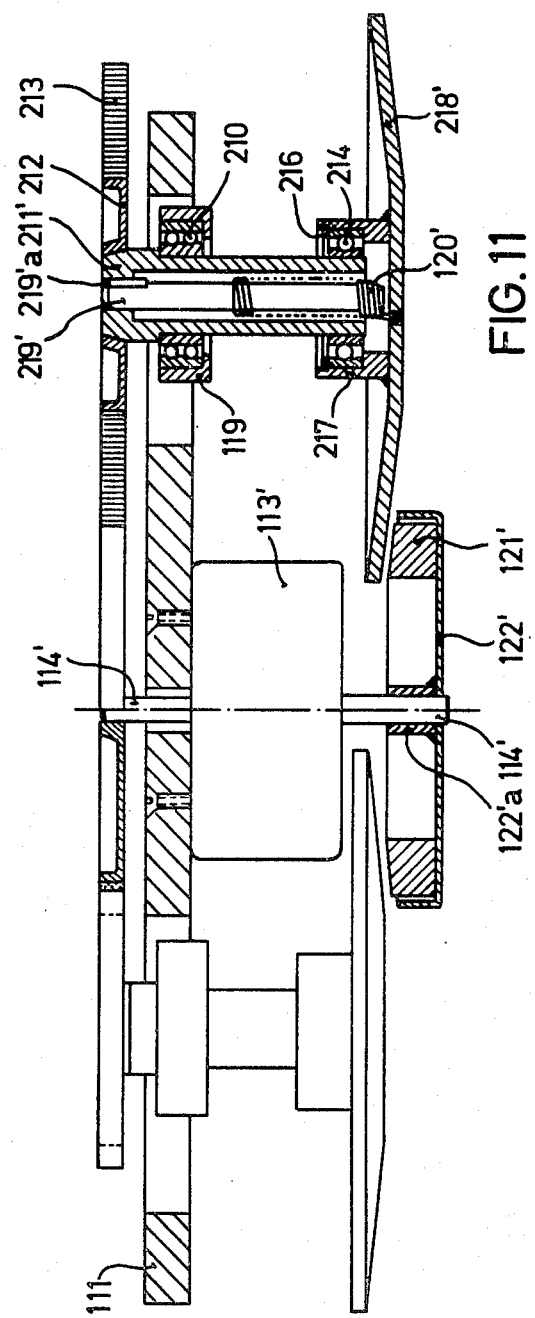
Figure 12:
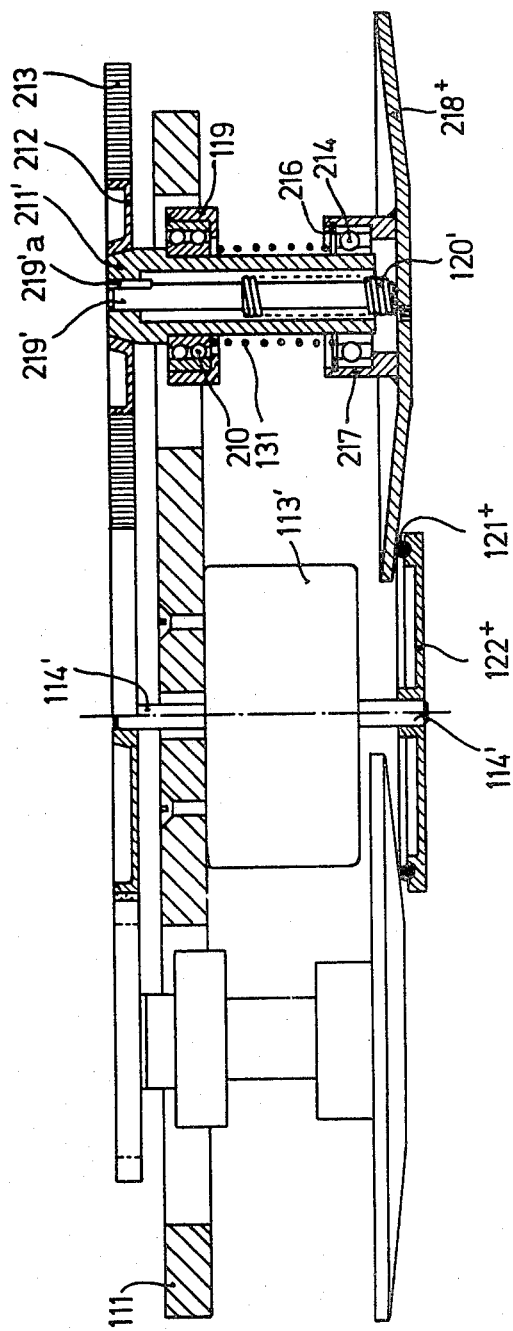
Figure 13:
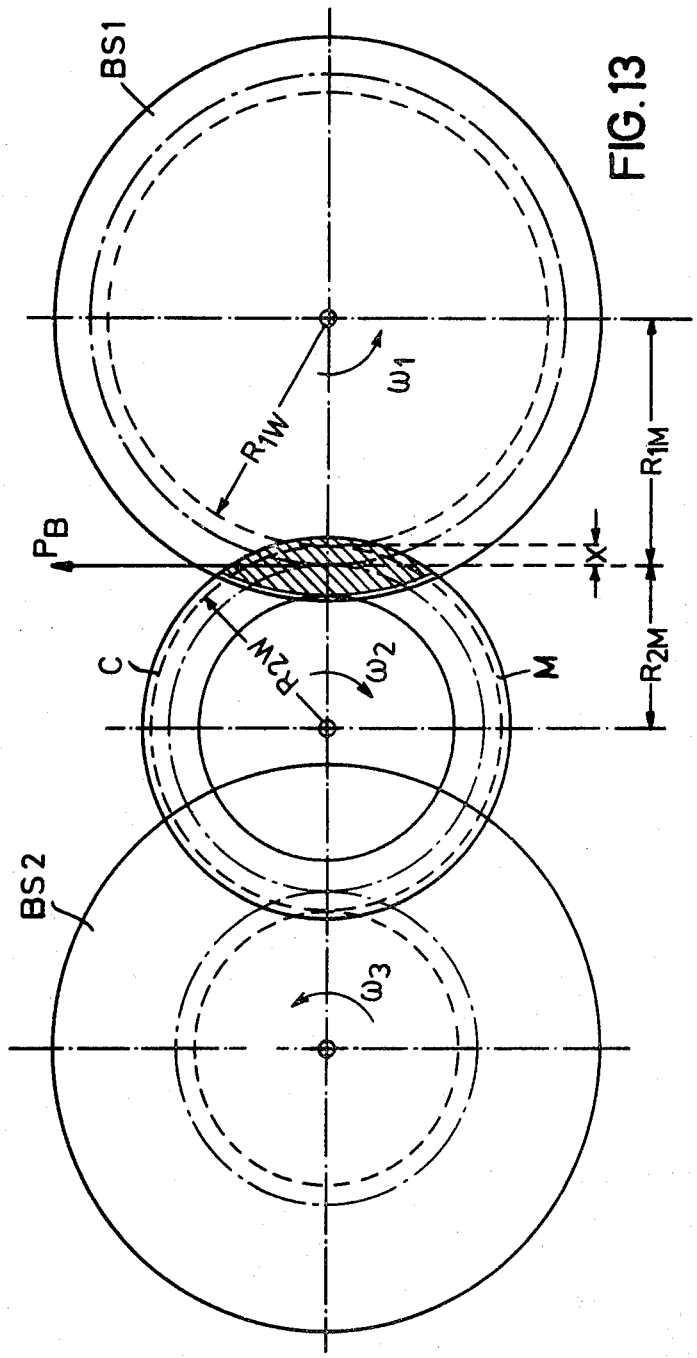
Figure 14:
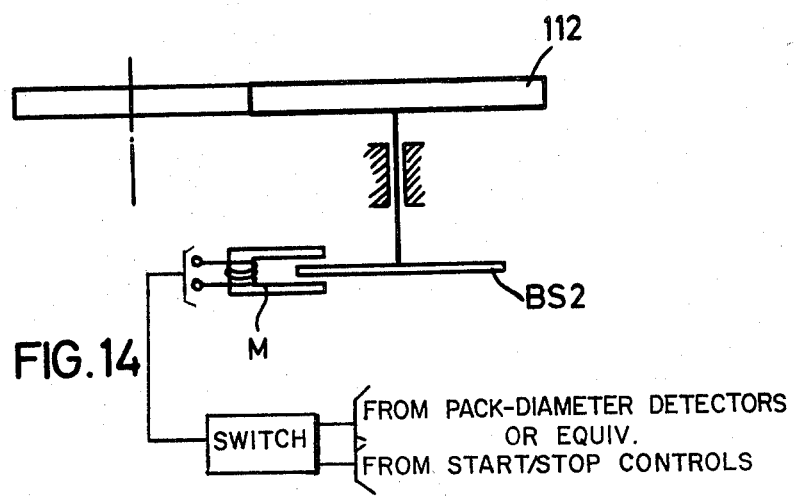
Figure 15:
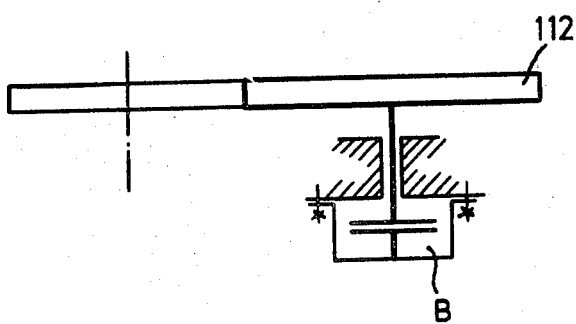

FIGS. 10a to d show in plan typical shapes of brake discs and magnets for employment in apparatus according to the invention;

FIGS. 10e to g show in longitudinal section typical shapes of brake discs and magnets for employment in apparatus according to the invention;

FIG. 11 shows another embodiment of a tape transport apparatus, in section, with free-wheeling arrangements between brake disc and shaft and a magnetic system on the shaft of the capstan;

FIG. 12 shows a tape transport apparatus similar to the apparatus shown in FIG. 11, but with a friction disc on the shaft of the capstan;

FIG. 13 is a diagrammatic representation of a braking device as shown in one or more of the foregoing figures, for calculating the energy return; and FIGS. 14 and 15 are diagrammatic representations in side elevation the different arrangement for the drive roll and a brake disc.

Figure 1:
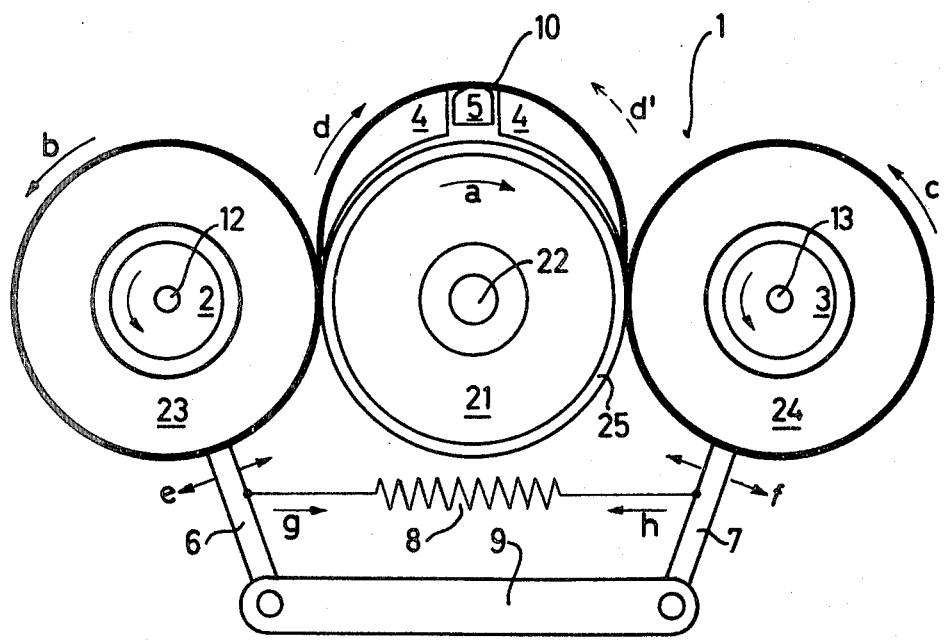
FIG. 1 shows, in diagrammatic representation, a contact-winding tape transport apparatus with tape pack supported on shafts mounted on pivoting arms.

FIG. 1 shows a contact-winding tape transport apparatus comprising a drive roll or capstan 21 which can be driven in opposite directions via shaft 22 by a drive motor (not shown in FIG. 1 but similar to motor 11 in FIG. 2) and which is provided with a resiliently deformable peripheral portion or rim 25. Tape packs 23 and 24, situated on the hubs 2 and 3 are urged against the rim, the hubs 2 and 3 being supported on shafts 12 and 13, respectively, mounted at the ends of two pivoting arms 6 and 7 which are hingedly connected on a chassis 9 of the transport apparatus 1. The contact pressure between the tape packs 23 and 24 and the capstan 21 is generated by a tension spring 8 which connects the pivoting arms 6 and 7.

If the capstan 21 is rotatably driven in the direction of arrow a, the packs 23 and 24 are driven in turn owing to the pressure at the points of contact with the peripheral rim 25 of the capstan, the sense of rotation of the tape packs being indicated by arrows b and c. In the case shown the tape pack 24 serves as a take-up pack and the pack 23 serves as a supply pack, the magnetic tape 10 being transported through a tape guide device 4 and a write/read head arranged therein. Arrow d indicates the direction in which tape 10 is transported when the capstan rotates in the direction indicated by arrow a. If the capstan 21 rotates in the opposite sense, every sense of rotation indicated by arrows b-c is likewise reversed, so that the direction in which the tape is transported is reversed, this being symbolized by the dotted arrow d'.

The pivoting dirrections of the pivoting arms 6, 7 are indicated by double arrows e and f. The pull of the tension spring 8 remains unchanged and is indicated by arrows g and h.

Figure 2:
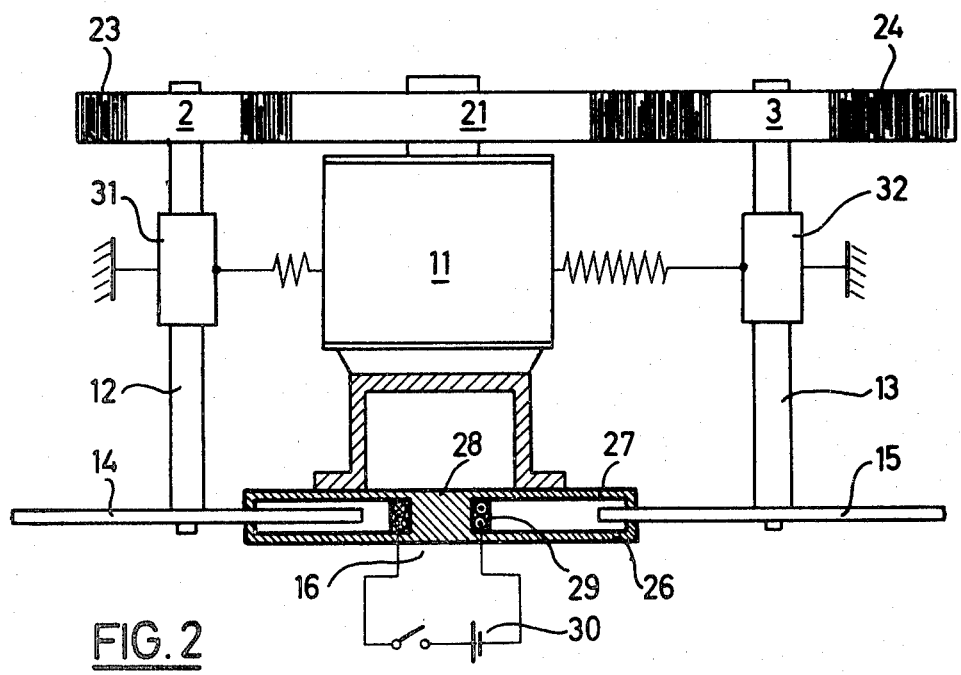
FIG. 2 shows the tape transport apparatus of FIG. 1 having an eddy current brake to provide tape transport apparatus according to the invention, the apparatus being shown in diagrammatic side elevation with tape packs of different diameter.
Figure 4:
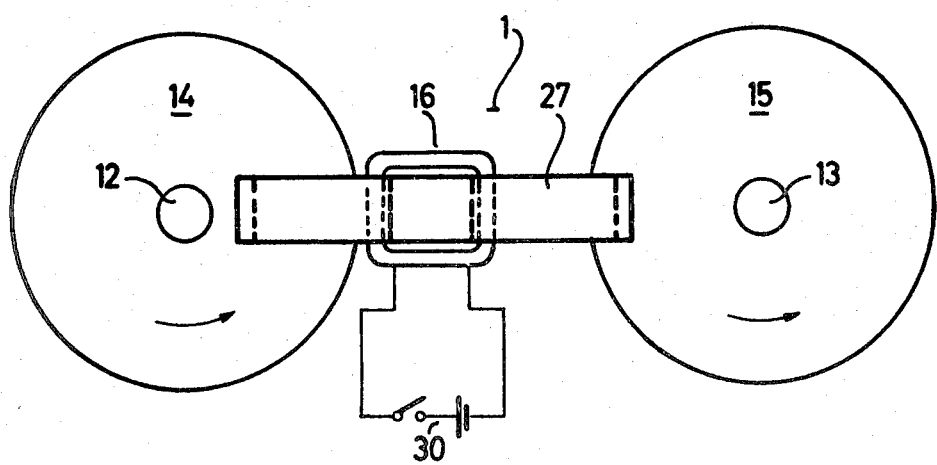
FIG. 4 shows in plan the magnetic braking system of the apparatus shown in FIG. 2.

In FIG. 2, the drive motor 11 is mounted on a part of the chassis 9 on which there is also provided, coaxially with the shaft 22, a magnetic arrangement or system 16 (see FIG. 4). The magnetic system 16 is essentially a one-piece system and comprises upper and lower pole pieces 27 and 26, a common center part 28 and an induction coil 29 surrounding the said center part, the coil being indicated by two conductors. Between the ends of coil 29 a switchable direct current source is provided for the purpose of energizing the coil and of producing the desired magnetic field strength.

As can be gathered from this drawing, the tension spring 8 is not directly connected to the shafts 12 and 13, but to box- or sleeve-type bearings 31, 32. At their lower ends, the shafts 12 and 13 are each provided with a brake disc 14 and 15, the latter being positively connected to the shafts. These discs either consist, at least partly, of a high-conductivity material, for example copper or aluminum, or are provided with a coating of a conductive, metallic material. The diameter of each disc is large enough for each disc still to enter between the pole pieces 27 and 26 when either one of the tape packs is fully wound. FIG. 2 shows a condition in which the tape pack 24 has not yet attained its maximum diameter while the tape pack 23 is not yet entirely empty. FIG. 4 shows the magnetic system 16 in plan view. Obviously, pole pieces of a different shape could also be employed.

Figure 3:
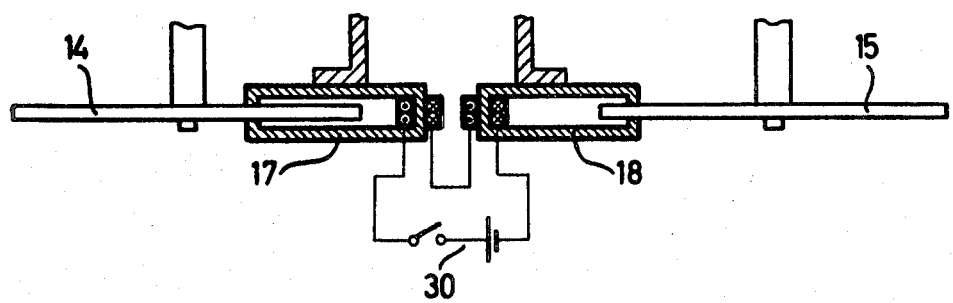
FIG. 3 shows an embodiment of a magnetic system, with two separate electromagnets instead of one common magnet, for employment in apparatus according to the invention.

FIG. 3 shows a section of a magnetic system comprising two series-connected electromagnets 17, 18 each of which is allocated to one of the brake discs 14 and 15. Effectively, this embodiment acts in the same way as the arrangement of FIG. 2.

Figure 5:
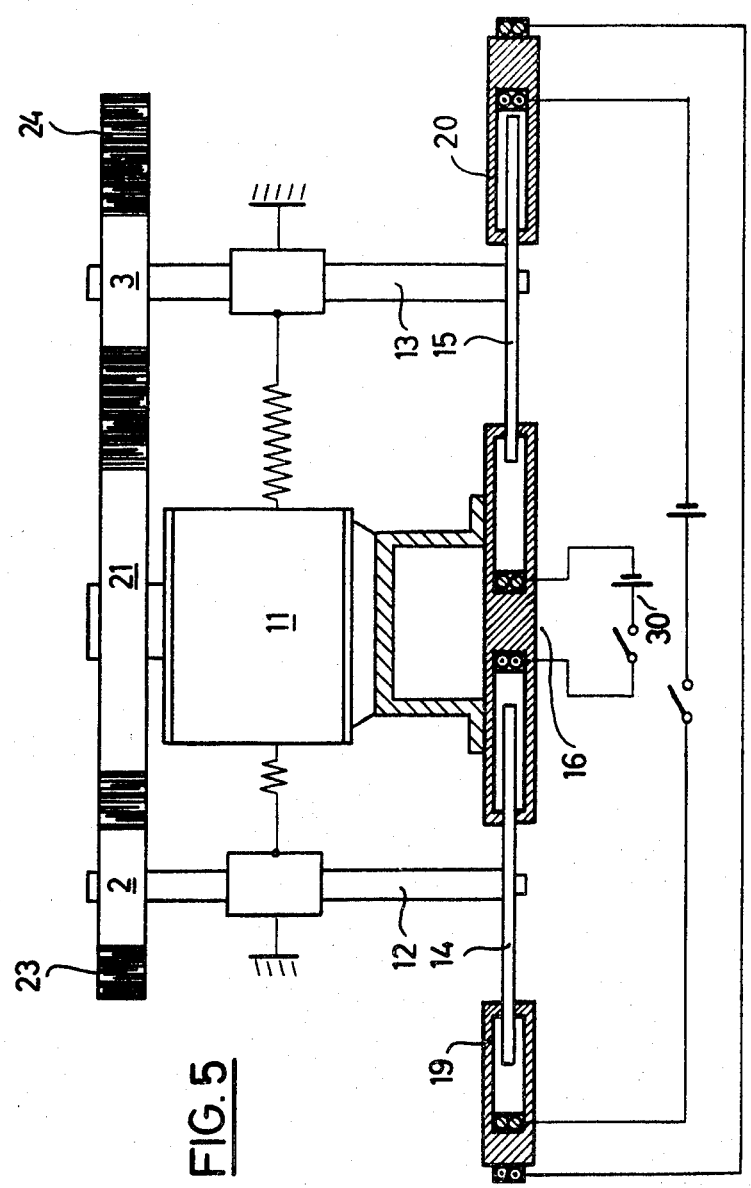
FIG. 5 shows another embodiment of a tape transport apparatus according to the invention and provided with a common and a split magnetic system.
Figure 6:
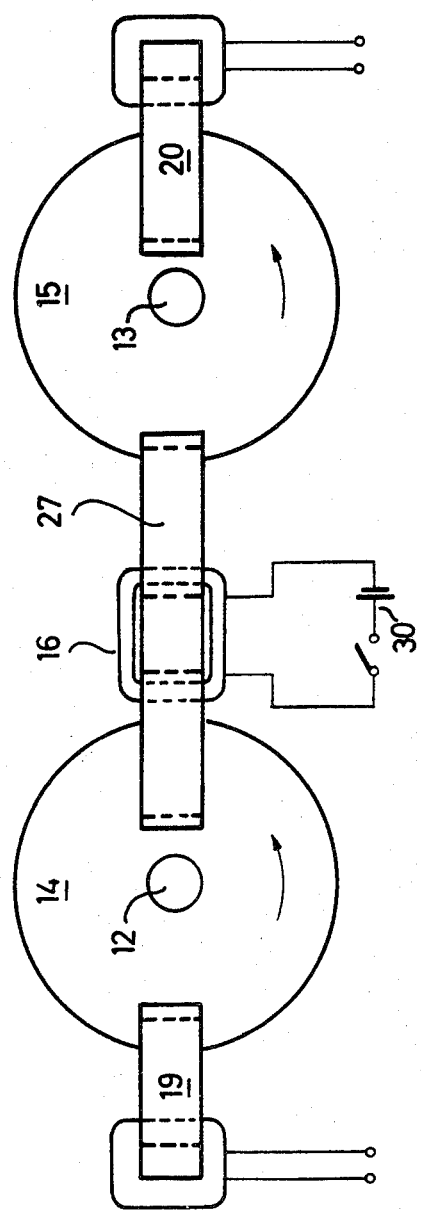
FIG. 6 shows in plan the magnetic braking system of the apparatus shown in FIG. 5.

FIGS. 5 and 6, on the other hand, show a common magnet 16 for both brake discs 14 and 15, as well as separate magnets 19 and 20, each allocated to one of the brake discs 14 and 15 and preferably arranged radially opposite the magnet 16 and, as shown in plan, of rectangular shape. As becomes apparent from FIGS. 5 and 6, the smaller pack 23, i.e. the pack having the lower moment of inertia, is subjected to a stronger braking effect than the pack 24 having the larger moment of inertia when the magnets 19 and 20 are activated during acceleration and the magnet 16 is switched off. This prevents the formation of loops.

At a point in time not later than that in which the pack diameters become equal, i.e. equal moments of inertia are attained, braking may be reversed in that, as is customary, the supply pack is subjected to a stronger braking action than the take-up pack in order to generate and maintain tape tension. The lastmentioned braking effect may of course be generated by both magnetic systems 19 and 20 as well as 16. Usefully, however, these braking forces are generated by magnets 19 and 20 whereas magnet 16 is used for actual braking to a stop, or when reversing the direction of tape travel.

Embodiments of apparatus according to the invention employing a hysteresis braking system are shown in FIGS. 7 to 14. In the apparatus shown in FIGS. 7 to 9, a drive motor 113 is mounted on a baseplate 111, its shaft 114 being positively connected to a capstan 115. At its periphery, the capstan 115 is provided with a resilient rubber layer or rim 116. The two tape packs are mounted on shaft 211. A pivoting arm 119 carrying the supply shaft is connected to the baseplate 111 by means of a bearing 118 and screw 117, and the shaft 211 of the take-up pack is connected to an equal pivoting arm by means of a bearing and screw. The recording tape 213 is wound upon hub 212 which, in turn, may be frictionally connected to the take-up shaft 211. Driving pressure P is generated by means of tensional spring 128.

Figure 7:
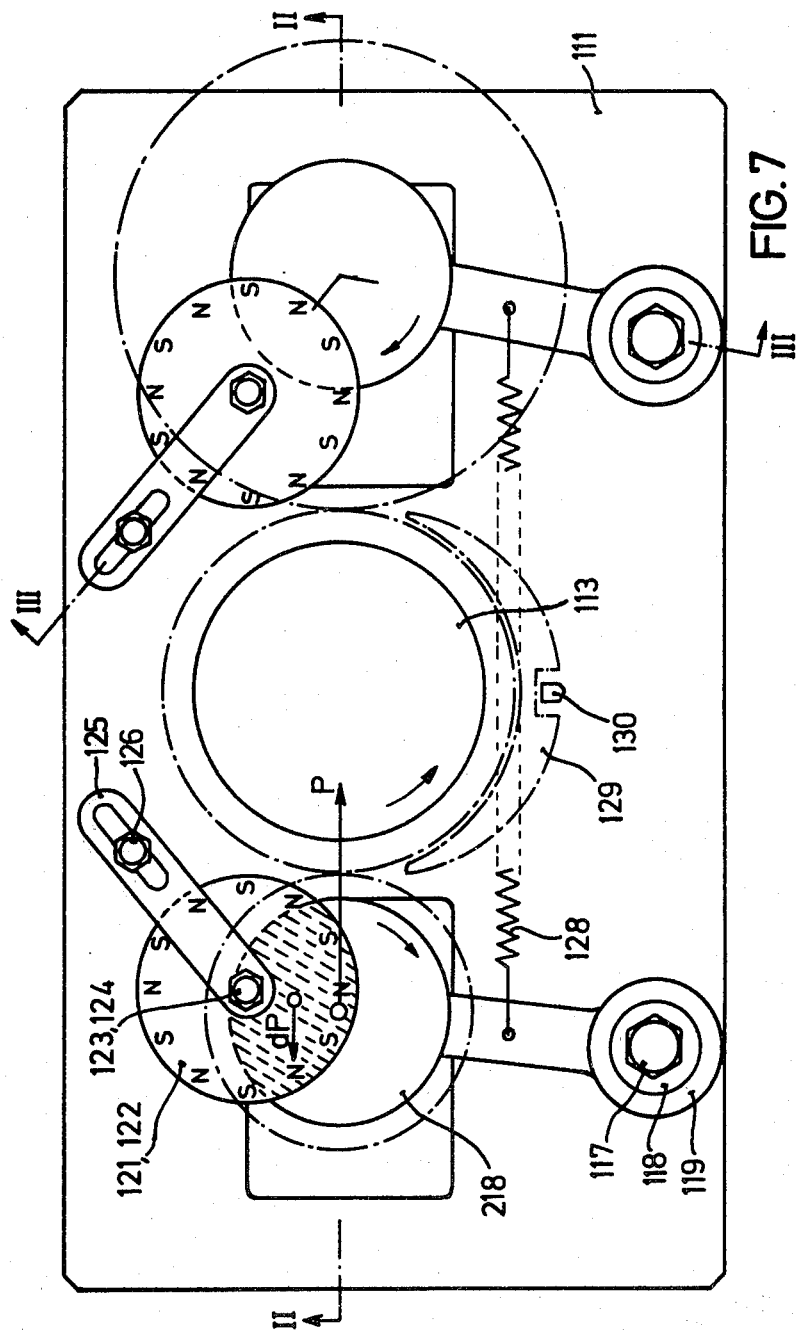
FIG. 7 shows in plan a further embodiment of a tape transport apparatus according to the invention and provided with brake discs consisting of hysteresis material.
Figure 8:
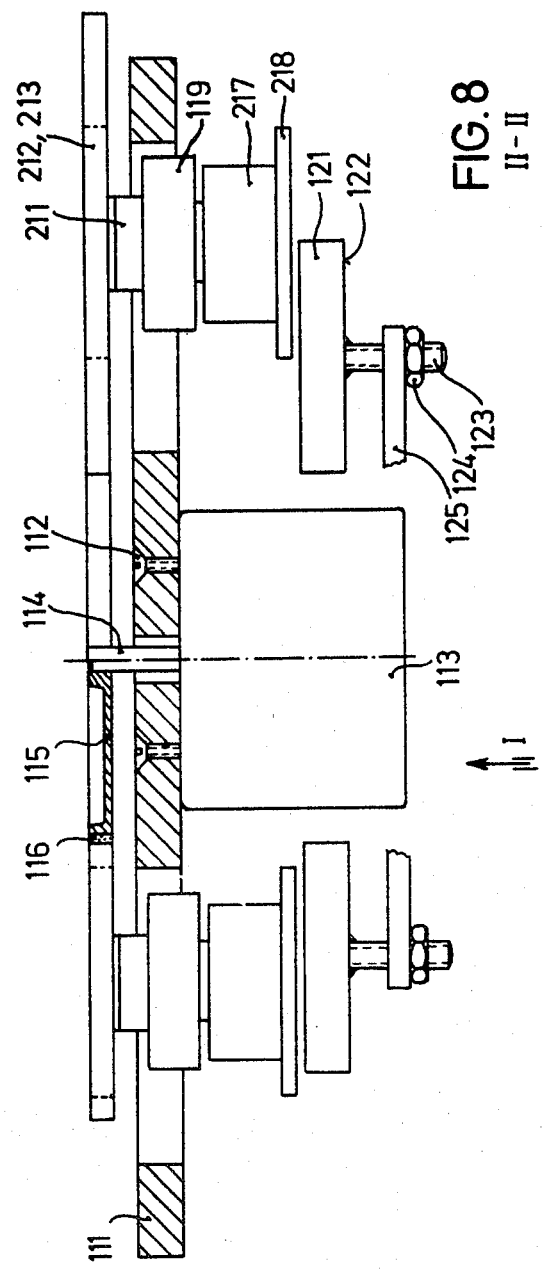
FIG. 8 is a sectional view along the line II—II of FIG. 7.
Figure 9:
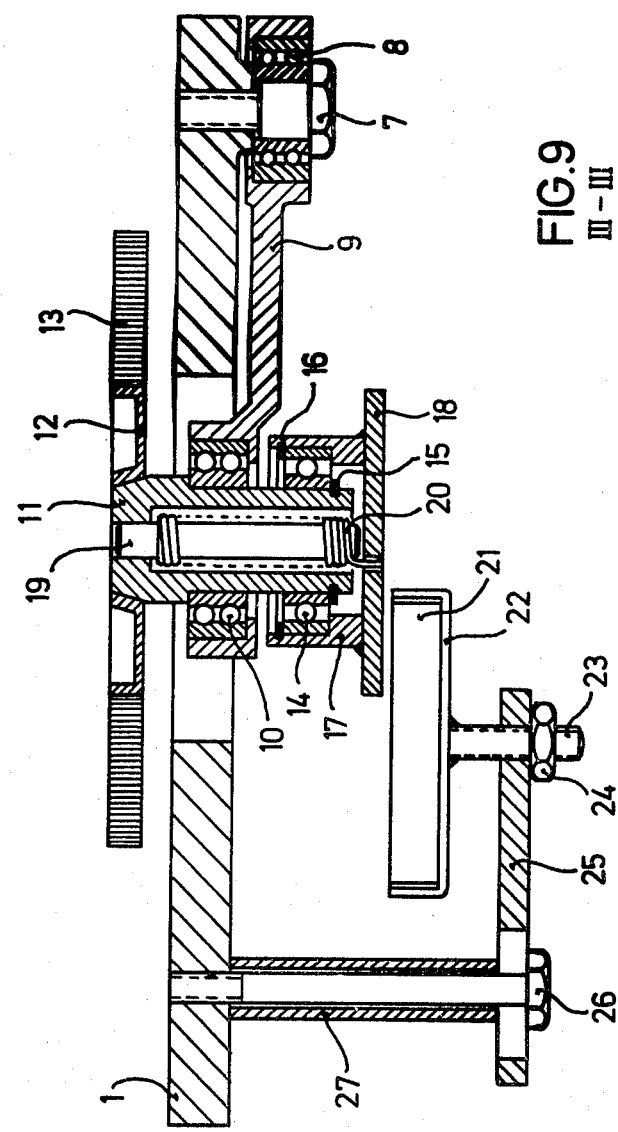
FIG. 9 is a sectional view along the line III—III of FIG. 7.
Figure 10:
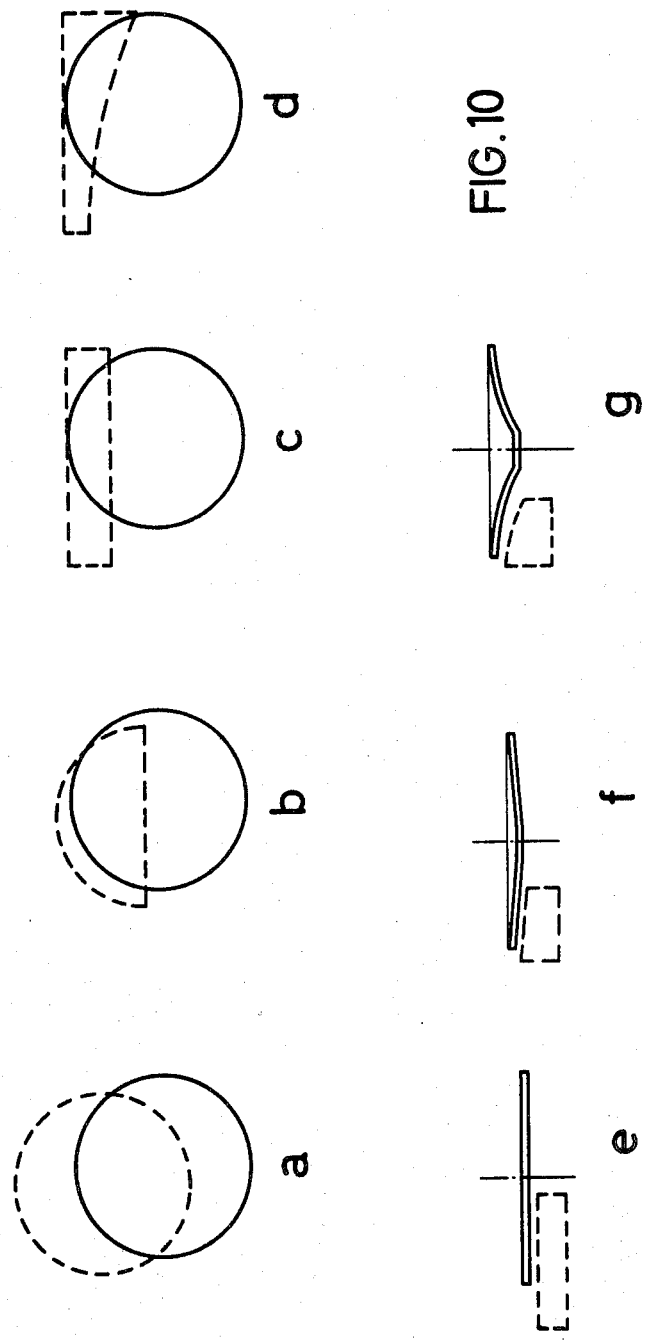

In the apparatus shown in FIGS. 7 to 9, the possibilities of selecting the brake force characteristic are limited. However, they can be considerably improved, for example by provision of a curved template connected to the pivoting arm 119 or by means of a lever system which varies the position of the constant-field magnet 121 in the desired manner as the tape pack diameter varies. Alternatively, the position of the pivoting arm 119 may be scanned by electrical and electronic means, and an electromagnet may be energized according to a desired characteristic. Of particular advantage are a permanent magnet and a brake disc of suitably matched shape, for example as shown in FIG. 10. The brake disc, in general, should be axially symmetrical, whereas the magnet may be given any desired shape. In order to generate the varying contact pressure forces between capstan and packs during tape transport, the magnetic system is preferably arranged at a distance from the straight line connecting the axes of the two tape packs, as explained hereinbelow.

The braking systems shown in FIGS. 7 to 11 may also be varied in that the brakes can be dimensioned in such a way as to generate only a pure braking component in tangential direction, so that controlled pressure forces are avoided. This principle is shown in FIG. 14 (and FIG. 15) where supply pack 112 is decelerated by a brake M (or B in FIG. 15) and a brake disc BS2. M is arranged tangentially, and the braking torque increases with the diameter of the tape pack. The capstan is indicated by C in FIG. 13.

The brakes B (FIG. 15) and M (FIG. 14) may be electromagnetic or permanent magnetic devices. As indicated in FIG. 14 additional control of the braking torque in dependence on pack diameter is effected by varying the electrical excitation. Further control of the braking torque during start and stop operations can be realized in a similar manner. Advantageously, a magnetic powder core brake of known type can be employed as a braking device. It offers the advantage of a nearly constant braking torque characteristic with varying speed at constant excitation. In the case of conventional couplings, the axis of the coupling must travel with the axis of the tape pack. The simplest way of achieving this is to mount a fixed member of the coupling to the pivoting arm.

An energy-saving variant of an apparatus according to the invention will now be described. The braking methods and devices hitherto described and illustrated have in common that, in order to generate the braking forces and bias forces, considerable amounts of energy are required. From the apparatus illustrated in FIG. 11 it can be gathered that, given suitable dimensioning of the braking energy it is possible not only to generate tape tension, but also the return energy for the purpose of driving the capstan. While this is of general advantage, it is of special importance for battery-operated machines.

In the apparatus shown in FIG. 11, a magnet 121' has been shrunk on a shaft 114' of a capstan motor 113'. Brake discs 218' are connected to both the shafts carrying the tape packs by means of clutch devices 219'. The supply pack for example is positively coupled to its brake disc, whereas the brake disc associated with the take-up pack can rotate freely and vice versa. The braking plus energy effect can be noted as soon as the effective speed of the magnet falls below that of the brake disc connected to the supply. Unidirectional clutch devices are known for use in magnetic tape transports of the type described for instance in U.S. Pat. No. 3,921,933.

Those skilled in the art will be able to gather the necessary information for the dimensioning and technical detail from the above descriptions. A particularly favorable embodiment comprises the application of hysteresis brake discs whose effective diameters are larger than the momentary diameter of the tape pack. The effective diameter of the braking magnet should otherwise preferably be less than that of the capstan. As a result, the major part of the braking power for generating the tape tension is recovered in the form of driving power for the capstan. This principle of energy feedback is of importance also for other tape transport systems, above and beyond its application in contact-winding transport systems. The contact pressure effect itself does not necessarily appear in the arrangement according to FIG. 11. It can, however, be generated, for example, by spacing apart the capstan or magnet axis from the streight line connecting the axes of the two tape packs.

FIG. 10 shows various shapes of brake discs and magnet arrangements with which to generate useful braking characteristics, the brake discs being illustrated by solid lines and the magnets by dotted lines. The brake discs may be of plane shape. Their efficiency and the brake force characteristic may be improved, however, by curved or conical, axially symmetrical brake discs 218' and magnets 121', similar to the illustration in FIG. 11. If necessary, the brake disc 218' with its support elements 214, 216, 217 and components 219, 219a, 120' of the clutch means may be axially displaceable on the take-up shaft 211', in accordance with the diameter of reel 213 and with the desired brake characteristic. This object is achieved, for example, by means of a cam or lever system not shown here in further detail or by means of other known control system.

The energy feedback coefficient 7 is calculated theoretically from FIG. 13, where $W_1, W_2, W_3$, are the angular velocities of the discs and the capstan. The contours of the brake discs BS1 and BS2 and of the magnet arrangement M are shown as solid lines, whereas the contours of the tape packs and the capstan C are shown as dotted lines. The tape pack on the left turns in the take-up direction ($\omega_3$) and BS1 in the supply direction ($\omega_1$). It follows that $$\eta = (N_r/N_B)$$

wherein
TI $N_r = P_B \times R_{2M} \times \omega_2$    feedback power $N_B = P_B \times R_{1M} \times \omega_1$    braking power, and $$= \frac{R_{2M} \times \omega_2}{R_{1M} \times \omega_1} = \frac{R_{1\omega} \times R_{2M}}{R_{2\omega} \times R_{1M}} = \frac{R_{1\omega}(R_{2\omega} - X)}{R_{2\omega}(R_{1\omega} + X)}$$

when
$R_{1\omega} \times \omega_1 = R_{2\omega} \times \omega_2$

FIG. 12 shows a similar design of a tape transport apparatus as regards energy feedback, to that of FIG. 11, the only difference being that the transmission of energy takes place generally by friction and not necessarily by magnetic forces. The brake disc 218+ is urged toward a friction ring 121+, consisting for example of rubber or synthetic material, according to the desired braking power. This can be achieved by means of a guide rail or lever system not shown, preferably with resilient transmission of power to the brake disc.

In the above-described embodiments the magnetic systems consist predominantly of electromagnets. Basically, it would also be possible to employ permanent magnets, but since the latter are not usually switchable, their use is abandoned in favor of electromagnets are preferred. For example, where permanent magnets are employed, increased drive energy is required to overcome the permanent-magnet braking torque. When using electromagnets, on the other hand, function-related on and off switching, and even control action is feasible.

With the aid of the above-described apparatus, three different braking functions may be achieved by well-timed connection and disconnection and by function-oriented control action:

(a) extremely rapid, energy-saving braking action down to zero, without the formation of tape loops or large variations of tape tension.

(b) A braking action for the pack of lower inertia in the case of extremely rapid acceleration of the tape packs up to desired speed, without the formation of tape loops or large variations of tape tension;

(c) compensation of tape tension fluctuations during the entire tape transport operation by controlled braking of the supply and take-up packs.

Devices needed for the timed sequence of control are detector devices for sensing the tape pack diameters or their moments of inertia or their momentary speeds, as well as switches controlled by such detectors which, in turn, connect and disconnect the electromagnets or vary their excitation, as schematically indicated in FIG. 14. These detector devices are preferably commercially available optical centrifugally controlled or speed-dependent devices which are connected to the electromagnets in ways obvious to those skilled in the art. A detailed description is therefore considered unnecessary.

The above-described magnetic tape transport systems were tested in the field and did more than come up to expectations. Other embodiments of the apparatus of the invention will be apparent or obvious to persons skilled in the art and therefore do not depart from the scope of the claims.

We claim:
1. A tape transport apparatus having
   a tape driving capstan which is rotatably mounted on a fixed shaft and has a resiliently deformable peripheral portion,
   means for driving said capstain,
   a take-up pack and a supply pack each mounted for rotation on a respective shaft,
   means mounting said packs for movement towards and from said capstan,
   contact pressure generating means for biasing said shafts towards said capstan so that the outermost tape turn of each tape pack is drivingly contacted by the capstan,
   said pressure generating means including braking means for varying the bias,
   said braking means comprising brake elements on the shafts carrying said tape packs and at least one magnetic system having a relatively stationary line of symmetry parallel to the shafts of said tape packs, said brake elements and said magnetic system being disposed so that said elements extend into the magnetic field of said magnetic system by an amount depending on the momentary diameter of the respective tape pack.

2. A tape transport apparatus as claimed in claim 1, in which said braking means is an eddy current brake, said braking elements being discs of non-magnetizable highly conductive material.

3. A tape transport apparatus as claimed in claim 1, in which said braking means is a hysteresis brake, each of said brake elements being generally disc-shaped and being at least in part of hysteresis material.

4. A tape transport apparatus as claimed in claim 1, in which the magnetic system comprises at least one electromagnet having at least one air gap.

5. A tape transport apparatus as claimed in claim 4, in which said apparatus further has switching means for controlling said electromagnet during starting and stopping.

6. A tape transport apparatus as claimed in claim 1, in which the magnetic system comprises at least one disc-shaped permanent magnet.

7. A tape transport apparatus as claimed in claim 1, in which said magnetic system is common to, and disposed between, two brake elements, said two elements extending into respective air gaps of said common magnetic system.

8. A tape transport apparatus as claimed in claim 1, in which separate magnetic systems are provided for said two brake elements, respectively.

9. A tape transport apparatus as claimed in claim 7, in which, in addition to said common magnetic system, separate magnetic systems are provided for said two brake elements, respectively.

10. A tape transport apparatus as claimed in claim 1, in which the magnetic system and the brake elements are dimensioned so that the brake element extends into the field of the magnetic system even when either one of the tape packs has its maximum diameter.

11. A tape transport apparatus as claimed in claim 1, in which the contact pressure generating means comprise, in addition to the braking means, spring means which together apply the desired contact pressure for the tape packs against the capstan, and in which the brake elements and the magnetic system apply a force to the capstan which counteracts the contact pressure exerted by the spring means, so that a desired tape tension characteristic is obtained without influencing the take-up pack.

12. A tape transport apparatus as claimed in claim 1, in which said apparatus also has unidirectional clutch means for coupling each said brake element to the respective tape pack shaft.

13. A tape transport apparatus as claimed in claim 1, in which the magnetic system is pot-shaped and comprises a plurality of permanent magnets, and in which there are provided adjustment means for varying the position of said magnets relatively to the respective brake elements.

14. A tape transport apparatus as claimed in claim 12, in which said clutch means comprises a free-wheeling pin and a spring coaxial thereto, the end portion of said spring fitting the pin with a narrow tolerance and little friction and having a minimum angle of response.

15. A tape transport apparatus as claimed in claim 1, in which the magnetic system comprises a plurality of magnets arranged tangentially such that a braking force is applied perpendicularly to the line of progression of said shaft without influencing the contact pressure force between the tape packs and the capstan, the brake element being arranged to extend with a larger section into the magnetic field as the diameter of the tape pack decreases.

16. A tape transport apparatus as claimed in claim 3, in which said magnetic system is of generally annular shape and is mounted on the capstan shaft for rotation with the capstan, said magnetic system being disposed for eccentric cooperation with said generally disc-shaped brake elements to be driven with slip by said elements, whereby the braking power of said braking means is utilized to drive said capstan.

17. A tape transport apparatus as claimed in claim 16, in which said generally disc-shaped brake elements are of rotationally symmetrical, curvilinear cross section and in which there are provided means for axially adjusting the spacing between said brake elements and said magnetic system.

18. A tape transport apparatus as claimed in claim 17, in which the magnetic system is spaced from the straight line connecting the two tape packs.

19. A tape transport apparatus as claimed in claim 16, in which said generally disc-shaped brake elements have an effective diameter greater than the momentary tape packs, and said generally annular-shaped magnetic system a smaller diameter than the capstan.

20. A tape transport apparatus having
a tape driving capstan which is rotatably mounted on a fixed shaft and has a resiliently deformable peripheral portion,
means for driving said capstan,
a take-up pack and a supply pack each mounted for rotation on a respective shaft,
means mounting said packs for movement towards and from said capstan,
contact pressure generating means for biasing said shafts towards said capstan so that the outermost tape turn of each tape pack is drivingly contacted by the capstan, said pressure generating means including braking means for varying the bias,
said braking means comprising a friction brake disc mounted on the capstan shaft for rotation with the capstan, and generally disc-shaped brake elements unidirectionally coupled to the respective shafts carrying said tape packs, said friction brake disc being disposed for eccentric cooperation with said generally disc-shaped brake elements to be driven with slip by said brake elements, whereby the braking power of said braking means is utilized to drive said capstan, and
said braking elements being disposed relatively to said friction brake disc so that the braking force produced depends on the momentary diameter of the respective tape pack.

21. A method for generating a constant tape tension in a tape transport apparatus having
a tape driving capstan which is rotatably mounted on a fixed shaft and has a resiliently deformable peripheral portion,
means for driving said capstan,
a take-up pack and a supply pack each mounted for rotation on a respective shaft, means mounting said packs for movement towards and from said capstan, contact pressure generating means for biasing said shafts towards said capstan so that the outermost tape turn of each tape pack is drivingly contacted by the capstan, said pressure generating means including braking means for varying the bias, said braking means comprising brake elements on the shafts carrying said tape packs and at least one relatively stationary magnetic system;

said method comprising varying the braking torque in dependence on the momentary diameter of the respective tape pack so as to produce a predetermined tape tension and maintaining said tension substantially constant.

22. A method as claimed in claim 21, said method further comprising applying, during acceleration of the tape pack from zero to nominal speed, a larger braking torque to the brake element associated with the tape pack having the smaller diameter than that applied to the brake element associated with the tape pack having the larger diameter.

23. A method as claimed in claim 1, said method further comprising applying, during deceleration from normal speed, a larger braking torque to that brake element the associated tape pack of which happens to have the greater diameter.

24. A method as claimed in claim 21, in which said braking torque varying step includes applying, during the tape transport operation at nominal speed, a larger braking torque to the brake element associated with the supply pack.

25. A method for generating a constant tape tension in a tape transport apparatus a tape-driving capstan which is rotatably mounted on a fixed shaft and has a resiliently deformable peripheral portion, a take-up pack and a supply pack each mounted for rotation on a respective shaft, contact pressure generating means for biasing said shafts towards said capstan so that the outermost tape turn of each tape pack is drivingly contacted by the capstan, said pressure generating means including braking means for varying the bias, said braking means comprising brake discs on the shafts carrying said tape packs and at least one relatively stationary magnetic system;

said method comprising:

during acceleration from zero up to a desired speed, applying a larger braking torque to the brake disc associated with the tape pack having the smaller diameter, during tape transport operation at nominal speed, applying a larger braking torque to the brake disc associated with the supply pack, so as to produce a predetermined tape tension and maintaining said tension substantially constant, and during deceleration from nominal speed to zero, applying a larger braking torque to the brake disc associated with the tape pack having the larger diameter.

* * * * *

UNITED STATES PATENT AND TRADEMARK OFFICE
CERTIFICATE OF CORRECTION

PATENT NO. : 4,225,098
DATED : September 30, 1980
INVENTOR(S) : Herbert Henkler et al It is certified that error appears in the above-identified patent and that said Letters Patent are hereby corrected as shown below:

Claim 23 (column 13, line 24,) "Claim 1" should read --- Claim 21 ---.

Signed and Sealed this

Ninth Day of December 1980

[SEAL]

Attest:

Attesting Officer

SIDNEY A. DIAMOND

Commissioner of Patents and Trademarks